Aug. 20, 1940.  A. M. HUMBY ET AL  2,211,750
WIRELESS TELEGRAPH SYSTEM
Filed Jan. 20, 1938  7 Sheets-Sheet 1

INVENTORS
Albert Maurice Humby
John Arthur Smale
Edward George Copper
BY Ralph B. Stewart
ATTORNEY

Aug. 20, 1940.   A. M. HUMBY ET AL   2,211,750
WIRELESS TELEGRAPH SYSTEM
Filed Jan. 20, 1938   7 Sheets-Sheet 4

Fig. 9.

Aug. 20, 1940.  A. M. HUMBY ET AL  2,211,750
WIRELESS TELEGRAPH SYSTEM
Filed Jan. 20, 1938  7 Sheets-Sheet 6

INVENTORS
Albert Maurice Humby
John Arthur Amale
Edward George Copper
BY Ralph B. Stewart
ATTORNEY

Patented Aug. 20, 1940

2,211,750

UNITED STATES PATENT OFFICE 2,211,750

WIRELESS TELEGRAPH SYSTEM

Albert Maurice Humby, John Arthur Smale, and Edward George Copper, London, England, assignors to Cable and Wireless Limited, London, England, a British company Application January 20, 1938, Serial No. 185,980
In Great Britain March 9, 1937

14 Claims. (Cl. 178—66)

This invention relates to radio telegraph systems, and is particularly concerned with receiving arrangements for eliminating or reducing the effects of fading and static interference.

It is often found that if when sending signals at a particular radio frequency, the signals fade so badly that they are not satisfactorily received, satisfactory reception can be obtained if the signals are sent at a slightly different frequency. Furthermore, the same applies if there is bad interference due to any cause giving rise to distortion of the signals sent on a given wave length, signals of a slightly different wave length being not so much affected.

The present invention, therefore, makes use of a system in which different frequencies are employed for the different signalling conditions representing the marking and spacing conditions, the purpose of the invention being to allow the signals on one of the wave lengths, for example that used for the marking condition, fully to take charge and give rise to intelligible signals in the receiving apparatus in the event that the signals on the other wave length, that is that used for the spacing condition, fade for a period or are subjected to bad interference.

With this in view, one object of the invention consists of a radio telegraph receiver embodying a circuit element tuned to receive both the frequency used for the marking, and that used for the spacing condition; the receiver also comprises a plurality of electrical filters connected to receive the output of that circuit element and to separate or sort out the components of the output representing the marking and spacing conditions in the signals; furthermore, a plurality of rectifier elements is provided for rectifying the outputs of the said filters, and the output from the rectifier elements is applied to a dead-beat circuit comprising a pair of interconnected electron discharge tubes having their control electrodes connected to receive the outputs of said rectifier elements in opposite senses in such a way that the condition of stability of the dead-beat circuit is determined only by changes in the amplitudes of either or both of the outputs of said rectifier elements applied to the discharge tubes. Thus the stability of the dead-beat circuit is not affected by a steady condition of either signal. The output signal from the receiver is determined by the condition of stability of the cuit.

The marking and spacing conditions occur alternately in the signals so that if the signals are undistorted, the signal of the marking frequency ceases when the signal of the spacing frequency commences, and vice versa. Thus, since the signals are applied in opposite senses to the dead-beat discharge tube circuit, that is to say in such a way that an increase in the marking signal affects the circuit in the same way as a decrease in the spacing signal, and vice versa, the marking and spacing signals are caused to assist one another in controlling the condition of the dead-beat circuit when the signal is undistorted.

A further object of the invention consists in applying the signals to a limiting circuit before they pass to the dead-beat circuit. This results in limiting the value of distortion due to interference on either frequency so that if severe interference affects the receiver, the limiting circuit prevents this giving rise to a spurious signal of greater amplitude than that determined by the limiting circuit. Therefore, during the duration of the interference, the signal on the marking or spacing frequency, whichever is distorted does not exhibit any changes in amplitude, and therefore the dead-beat circuit is controlled only by the signals on the other frequency of transmission which does not suffer the effects of the interference, and which therefore entirely takes charge.

Satisfactory results are obtained by employing closely located frequencies for transmitting the marking and spacing conditions, and indeed, in such a case the transmissions require a smaller waveband for working than does the usual modulated telegraph system or a speech modulated transmitter. However, with small difference between the two frequencies used, a slight variation of the transmitted frequencies or in the case of a heterodyne receiver, a slight variation in the frequency of a heterodyne oscillator, would be sufficient to cause one of the signal-separating or sorting filters to pass both the marking and spacing signals.

A further object of the invention consists of a heterodyne receiver which embodies means for controlling the frequency of a heterodyne oscillator in the receiver according to the resultant frequencies employed for the spacing and marking conditions so that these resultant frequencies are kept within limits which makes it possible for the separating filters in the receiver respectively to pass only those frequencies for which they are intended.

The invention is further illustrated in the annexed drawings, in which:

Figure 13 a central section on the line XIII—XIII in Figure 12 of an electro-magnetically operated motor for use in correcting the frequency of the heterodyne oscillator; while

Figure 1:
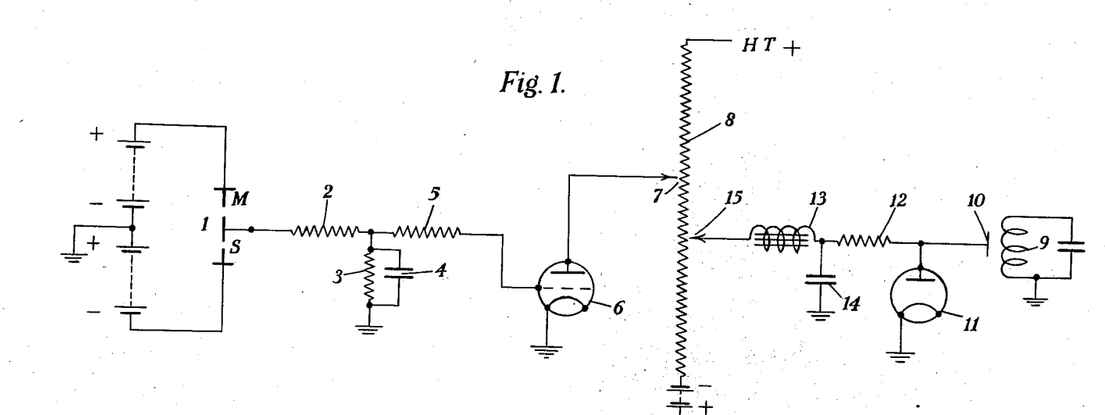
Figure 1 is a circuit diagram showing an arrangement of a radio transmitter enabling the marking and spacing conditions to be sent at different frequencies.

In Figure 1, a circuit of a transmitter is shown in which the transmitted frequency is changed as the relay 1 is moved from its marking contact M to its spacing contact S. The input relay 1 causes positive or negative voltages to be applied across a potential divider consisting of a resistance 2 in series with a resistance 3 and a condenser 4 in parallel, the voltage from the intermediate point of this potential divider being applied through a high resistance 5 to the grid of a three-electrode electron discharge tube 6. This discharge tube thus becomes alternately conducting and non-conducting, and thus alters the voltage of the point 7 on the potential divider 8 connected between a positive and a negative source of potential with respect to ground. The oscillatory circuit 9 is the circuit which controls the frequency of the transmitted wave, and has capacity to a plate 10. Thus, if this plate is grounded, it will alter the frequency of the transmitter. This plate is in fact connected to the anode of a diode 11 the cathode of which is grounded and is also connected through a high resistance 12 and smoothing circuit consisting of inductance 13 and a condenser 14 to a point 15 on the potential divider 8.

The circuit is adjusted for operation as follows:

With the input relay on its spacing contact S, so that the discharge tube 6 is non-conducting, the tap 15 is adjusted so that the diode 11 carries some direct current, and thus becomes substantially conducting to alternating currents resulting from small alternating voltages superimposed on its anode. The input relay is then changed to its marking contact and the tap 7 is adjusted till the diode 11 carries no current.

In operation, the diode 11 thus becomes alternately conducting and non-conducting to voltage variations on the plate 10, and thus the plate 10 becomes alternately grounded and free, and so varies the frequency of the transmitter.

Figure 2:
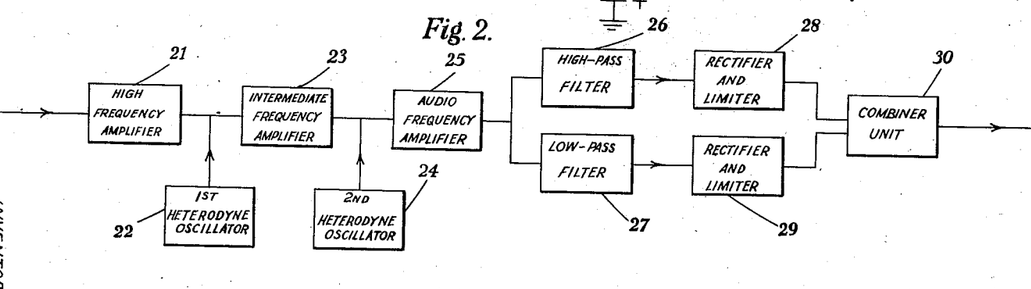
Figure 2 is a general circuit diagram, showing a radio telegraph receiver arranged in accordance with the invention.

In Figure 2, the high frequency received signal consisting of marking and spacing periods of different frequencies is applied to a high frequency electron tube amplifier 21, which is arranged to pass both the marking and spacing frequencies. The output of this amplifier is mixed with the output from a first heterodyne oscillator 22, and is applied to an intermediate frequency amplifier 23 which is arranged to pass the desired beat frequencies produced by combining each of the frequencies in the received signal with the output from the first heterodyne oscillator, but to remove other frequencies present. The output of the amplifier 23 is mixed with the output of the second heterodyne oscillator 24 and applied to an audio-frequency amplifier 25 which is arranged to cut off the frequencies present other than the desired beat frequencies between the frequencies passed through the intermediate frequency amplifier and the second heterodyne oscillator output. The output from the audio-frequency amplifier is passed to two filters 26, 27, which are respectively high and low-pass filters arranged to separate the audio frequency signals representing mark and space. These signals are then passed to two rectifying and limiting circuits 28 and 29 in which they are rectified, the audio frequency components of the signals being removed, and the signals are limited in amplitude however great the amplitude of the applied signals, and so any abnormal amplitude due to interference is removed. The signals are then applied in opposite senses to a dead-beat circuit included in a combiner unit 30 in such a way that the condition of stability of this circuit is determined only by the changes in the values of one or both of these signals. The output signal is determined by the condition of stability of the dead-beat circuit.

It may be found that the frequencies of the transmitter or of either of the heterodyne oscillators 22 or 24 vary in use sufficiently to cause the output frequencies from the amplifier 25 to be varied so much from the values for which the filters 26 and 27 are designed, to prevent these frequencies from being satisfactorily separated by these filters.

Figure 3:
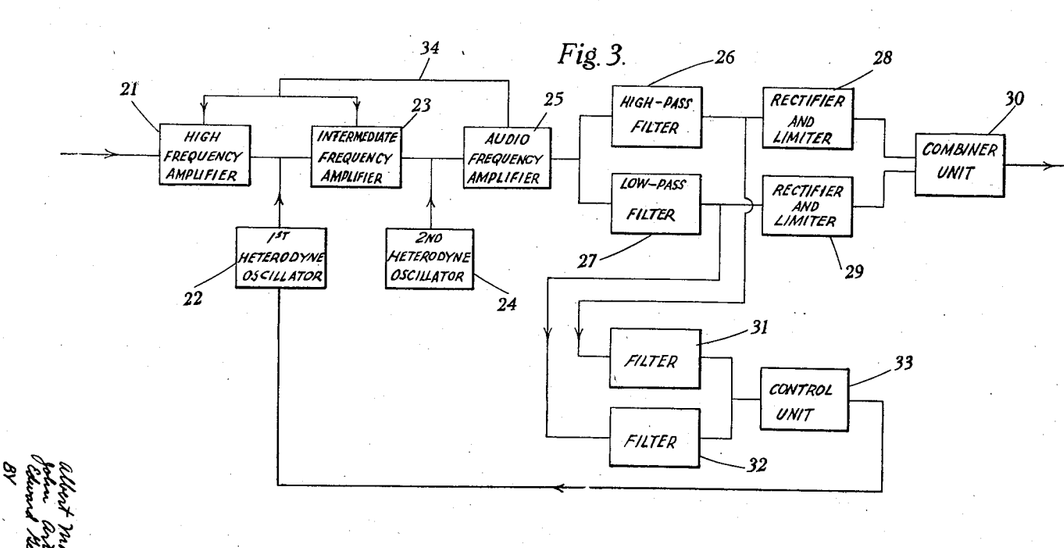
Figure 3 is a similar diagram to Figure 2, embodying also arrangements for controlling the frequency of a heterodyne oscillator.

Figure 3 therefore shows diagrammatically a modified form of the arrangement shown in Figure 2, corresponding parts being indicated by the same reference numerals. The outputs from the filters 26 and 27 are applied to two band-pass filters 31 and 32 and an automatic frequency control unit 33 which, if the frequencies of the signals applied to the filters 31 and 32 vary from their correct values, applies a control to the heterodyne oscillator 22 to reduce this variation. The operation of the band-pass filters 31 and 32, and the control unit 33 and its method of controlling the frequency of the heterodyne oscillator will be described later.

Automatic gain control is provided from the audio-frequency amplifier 25 to the high frequency and intermediate frequency amplifiers 21 and 23 by way of the bus-bar 34. Automatic gain control may be used with advantage in this system because when working, the transmitting station is always radiating energy of one frequency or the other, there being no times when the transmitter is not radiating, as there are in continuous wave telegraphy.

Figure 4:
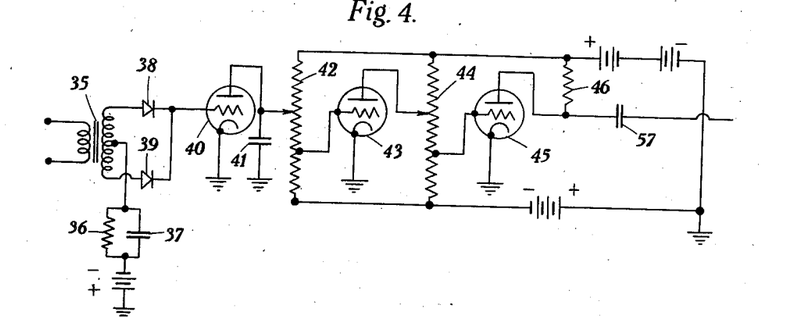
Figure 4 is a circuit diagram showing in detail the rectifying and limiting unit used in Figures 2 and 3.

Figure 4 shows the circuit of one of the rectifying and limiting circuits 28 and 29 in Figures 2 and 3. The output of the filter circuit 26 or 27 is applied to the primary winding of the transformer 35 which has the mid-point of its secondary winding connected through a resistance 36 and condenser 37 in parallel to a negative bias voltage supply 137. The two ends of the secondary winding are connected through copper oxide rectifiers 38 and 39 to the grid of a discharge tube 40 in such a way that they will each have their lower resistance when current is flowing from the transformer secondary to the tube 40. The pulsating voltages on the anode of this tube are passed through the condenser 41 to ground. The output from the tube 40 is resistance-coupled by the potential divider 42 to a further discharge tube 43, which in turn is resistance coupled by the potential divider 44 to another discharge tube 45.

In the absence of a signal, the grid of the tube 40 is kept at the potential of the negative bias supply, as the rectifiers 38 and 39 are not completely insulating in the reverse direction. The bias voltage is arranged to cut off the anode current of the tube 40 under these conditions. When a signal arrives, rectification by the rectifiers 38 and 39 increases the positive voltage of the grid and so causes this tube 40 to conduct. If the amplitude of the received signal becomes sufficiently large to raise the potential of the grid of the tube 40 as high as its cathode voltage, then grid current will flow in this tube, and through the resistance 36, and so reduce the voltage of the mid-point of the secondary winding of the transformer 35. This further increase in applied signals will cause very little further increase of current in the tube 40, on account of the grid current in this tube. The circuit consisting of the resistance 36 and condenser 37 in parallel has a relatively long time constant so as automatically to control the grid bias in accordance with the strength of the incoming signals. The tube 43 operates so that when the tube 40 becomes conducting, it is completely non-conducting and the tube 45 operates so as to be completely non-conducting when the tube 43 is conducting. Thus any rounding off of the received signals is removed, and the signal is made to change rapidly from one condition to the other. The output of the circuit is taken from the anode of the tube 45 through a condenser 57, while the resistance 46 provides the load for this tube. It will be seen that when a signal arrives, it will cause an increase in the grid voltage of the tube 40, and therefore decrease the anode voltage of the tube 45.

Figure 5:
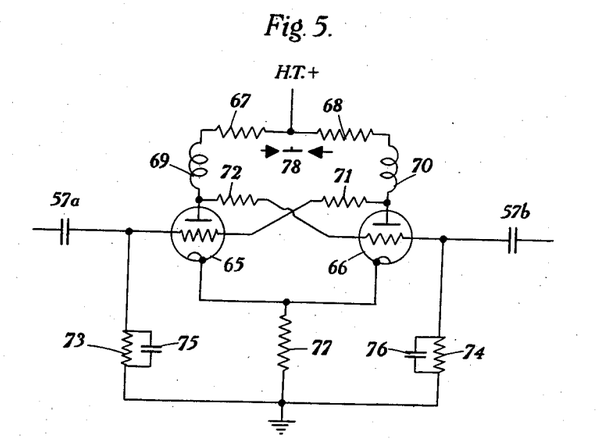
Figure 5 is a circuit diagram showing in detail the combiner unit comprising the dead-beat discharge tube circuit used in Figures 2 and 3.

Figure 5 shows the circuit of the combiner unit shown at 30 in Figures 2 and 3 and the condensers 57a and 57b which are the two condensers, corresponding to the condenser 57 of Figure 4, of the two limiter circuits for the marking and spacing signals respectively. Each of the two discharge tubes 65 and 66 forming the dead-beat circuit has in its anode circuit a resistance 67, 68 and a coil 69, 70 of the polarised output relay 78 so that the combined signal at the receiving end is dependent on which of the tubes 65 or 66 is carrying anode current. The output relay may be arranged to be controlled by the current in one of the tubes of the dead-beat circuit either by the use of a non-polarised relay, or, where a polarised relay is used, by suitably biassing the latter. The grid of each tube 65, 66 is connected through resistances 71 and 72 to the anode of the other tube, and also through resistances 73 and 74 in parallel with by-pass condensers 75 and 76 to ground. The cathodes of the two tubes 65, 66 are biassed positively relative to ground by the drop in voltage caused by their anode currents flowing in the common resistance 77. The resistances of the various components in the circuit are chosen so that when one tube, for instance the tube 65, is conducting, the voltage on its anode, which is lower than the high tension supply voltage by the voltage drop in the resistance 67 and relay winding 69, causes the voltage of the grid of the tube 66, which, on account of the potential divider consisting of resistances 72 and 74, is a definite fraction of the voltage on the anode of the tube 65, to be sufficiently negative with respect to the cathodes to prevent anode current from flowing in the tube 66. Thus the anode of this tube 66 is at approximately the high tension supply voltage. This causes the grid of the tube 65 to be sufficiently positive to maintain the anode current flow in this tube. Thus in the absence of any external control, this tube will remain conducting indefinitely. Therefore, as the circuit is symmetrical, it will maintain the condition of stability with either tube conducting until it is affected by an external control. For instance, if while the tube 65 is conducting, the voltage of the grid of the tube 66 is increased sufficiently to cause it to conduct, then the consequent fall in voltage of its anode reduces the voltage on the grid of the tube 65 and so reduces the current therein. Thus the voltage of the anode of the tube 65 increases and so causes further increase of the grid voltage of the tube 66. In this way, the circuit may be caused to change from the one condition of stability with the tube 65 conducting to the other condition of stability with the tube 66 conducting. A short positive pulse only on the grid of the tube 66 is sufficient to cause this change, or alternatively the change could have been brought out by a short negative pulse on the grid of the tube 65.

The outputs from the two limiter circuits 28 and 29 of Figure 3 which pass marking and spacing signals respectively are applied through two condensers 57a, 57b respectively to the grids of the two tubes 65 and 66 of the dead-beat circuit shown in Figure 5. On account of these condensers, the dead-beat circuit is responsive only to changes in value of the signals in the limiters, and not to their absolute value.

Under normal conditions of reception, at the end of a mark, the current through one limiter due to the marking frequency falls, while current through the other limiter due to the spacing frequency rises. These variations are applied one each to the grids of the tubes 65 and 66. As these signals are changing in opposite directions, and are applied each to the grid of one of the tubes 65 or 66, they tend to affect the dead-beat circuit in the same direction, and so assist one another in changing over its condition of stability. It is arranged, however, that the signals applied through the limiters are each sufficiently large to control the dead-beat circuit alone. Thus, in the absence of either the marking or spacing frequency, the signal of the other frequency will continue to control the dead-beat circuit according to the transmitted signal. Also, if there is bad interference on one frequency, energy may be received at that frequency throughout periods when no energy should be received. Changes in level in this interference are removed by the limiter circuit so that this interference appears only as an absence of change in the value of the signals through one limiter. Therefore no impulses will be applied from this limiter through the condenser 57 to the dead-beat circuit which will then be controlled by the unaffected frequency only.

The operation of the system will now be described with reference to Figures 6, 7 and 8 which show the output of the combiner unit for the signals received under different transmission conditions, against a time base. In each of these diagrams, the transmitted signal consists of repetitions of the letter V in Morse code consisting of three dots and a dash followed by a letter space, equal in duration to one dash.

Figure 6:
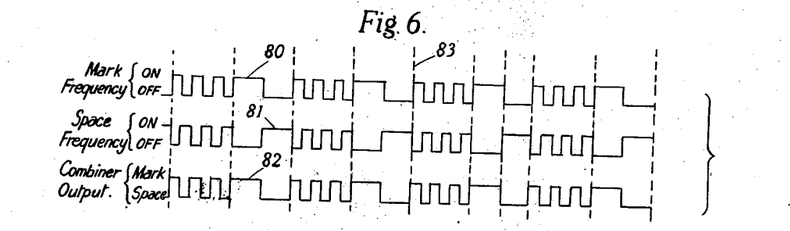
Figures 6, 7 and 8 are explanatory diagrams showing how the invention deals with distorted signals.

In Figure 6, the received signal is free from mutilation on both channels; the line 80 shows the periods when the marking frequency is on and off, and the line 81 shows when the spacing frequency is on and off. The line 82 shows the markings and spacing periods in the combiner output. Just before the instant of time indicated at 83, the spacing signal is on and the dead-beat circuit is in its condition of stability with the tube 66 non-conducting, and its output relay in its spacing position. At the instant 83, the marking signal increases and the spacing signal decreases, and thus negative and positive pulses are applied through the condensers 57$^a$ and 57$^b$ respectively to the grids of the tubes 65 and 66. These impulses assist one another in changing over the dead-beat circuit to its other condition of stability. Similarly a decrease in the marking signal and a simultaneous increase in the spacing signal will change the dead-beat circuit back from its condition of stability with the tube 65 non-conducting to its condition with the tube 65 conducting.

Figure 7:
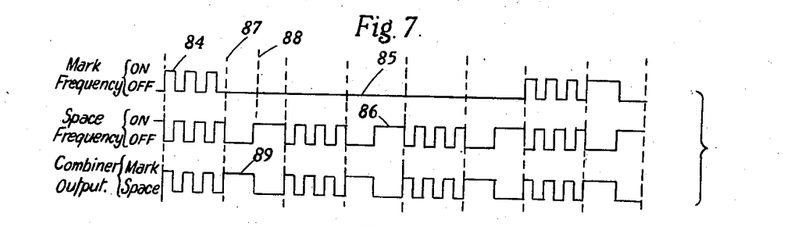

Figure 7 shows the condition in which the marking frequency is subject to fading. The received signal on the marking frequency shown at 84 is subject to fading at 85, but the spacing signal 86 is received without mutilation. The output of the combiner unit is shown at 89. just before the instant 87, the dead-beat circuit is in its condition of stability with the tube 66 non-conducting, and the output relay in the spacing condition. At the instant represented at 87, the spacing signal falls away but the marking signal does not rise. The fall in the spacing signal, however, applies a positive pulse through the condenser 57$^b$ to the grid of the tube 66, and this pulse is sufficient in magnitude to fix the condition of the circuit without a control pulse on the other grid. At the instant indicated at 88, when the spacing signal next changes, the marking signal still being missing, the negative pulse which the increase of the spacing signal applies to the grid of the tube 66 changes the dead-beat circuit back to its original condition with the tube 66 non-conducting.

Figure 8:
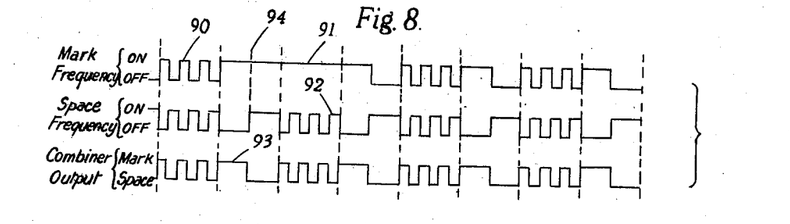

Figure 8 shows the condition in which the marking signal 90 is lost due to interference at 91, while the spacing signal 92 continues to be received. The output of the combiner unit is shown at 93. Just before the instant of time shown at 94, the dead-beat circuit is in its condition of stability with the tube 65 non-conducting, and the output relay is consequently in the marking condition. At the instant 94, the rise in the spacing signal causes a negative pulse to be applied to the grid of the tube 66 to change over the condition of the dead-beat circuit, and when the spacing signal falls again, then it changes the condition of the dead-beat circuit back to its original condition with the tube 65 non-conducting.

For Figures 7 and 8, the mutilation has been described as appearing on the marking signals. If, however, mutilation of either type had appeared on the spacing signals, then the combiner unit would have been controlled by the changes in the marking signals.

Figure 9:
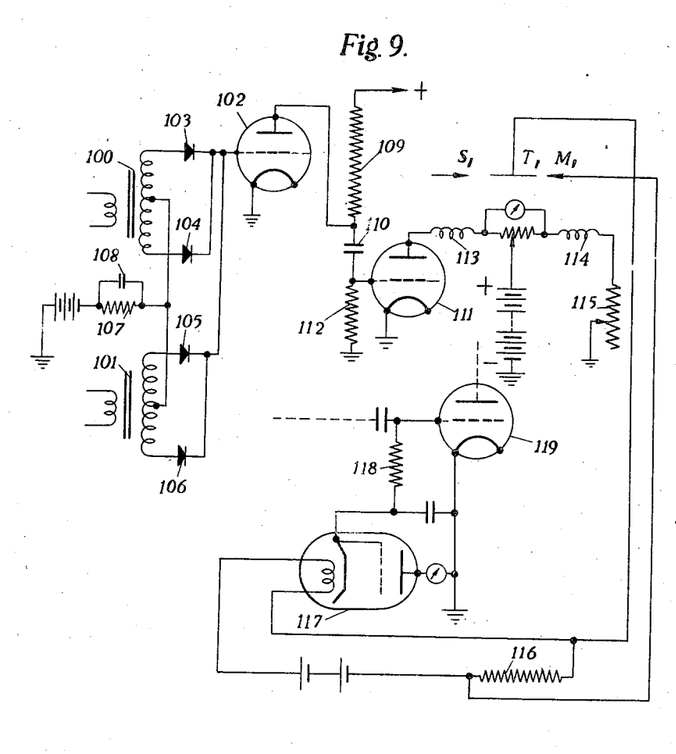
Figure 9 is a circuit diagram showing in detail one arrangement for controlling the frequency of the heterodyne oscillator.

To obtain the greatest advantage from this system, it is advisable to have the two transmitter frequencies close together, so that the transmissions do not cover a greater band width than would a normally modulated telegraph transmitter or a speech-modulated transmitter. However, if this is done, small variations in the frequencies of the transmitter, or in the frequency of either of the heterodyne oscillators 22 or 24 of Figure 2, would cause sufficient variation of the frequencies in the audio-frequency amplifier 25 of Figure 2 to make both these frequencies pass through either one or the other of the filters 26 or 27. Therefore, the circuit shown in Figure 9 is provided for controlling the frequency of the first heterodyne oscillator according to the frequencies of the signals in the audio-frequency amplifier, as mentioned above with reference to Figure 3. The outputs from the filters 31 and 32 of Figure 3 are applied to the primary windings of the transformers 100 and 101 of Figure 9. Each of the secondary windings of the transformers provides, in conjunction with the tube 102 a rectifying circuit similar to that described with reference to Figure 4, comprising rectifiers 103, 104, 105, 106 and a resistance 107 and condenser 108. As the grid bias voltage of the tube 102 is dependent upon the voltage developed across the parallel circuit 107, 108, as a result of the grid current, the anode current of this tube will vary in accordance with the greater signal of the two applied to the input transformers 100 and 101. The tube 102 is provided with a load resistance 109 and a coupling condenser 110 to the grid of a tube 111, provided with a grid leak 112. The anode current of this tube 111 flows in one winding 113 of a polarised relay S$_1$T$_1$M$_1$ while a direct current flows from the source of anode voltage of the tube 111 through a further winding 114 of the polarised relay and through a variable resistance 115. The contacts of this relay are arranged to short-circuit and throw into circuit a resistance 116 in series with the heater of a tube 117 which is connected to act as a diode. This tube is in series with a resistance 118, and the tube and resistance together provide a variable grid leak for the oscillator tube 119 providing the first heterodyne 22, (Figure 3). Variations in this grid leak resistance cause small variations in the oscillator frequency which are, however, sufficiently large to give effective control.

Figure 10:
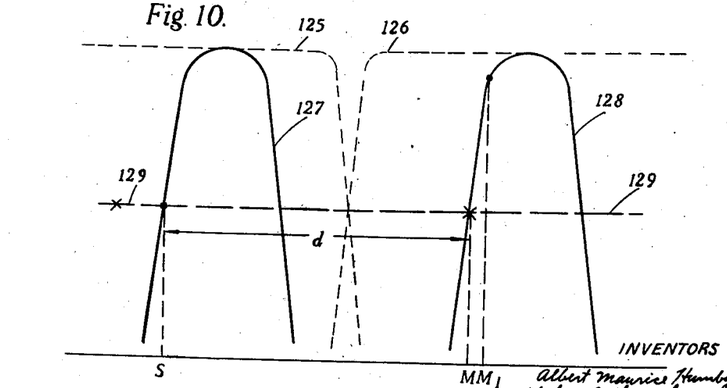
Figure 10 is an explanatory diagram showing the characteristics of the filters employed.

Figure 10 shows characteristics of the filter circuits shown at 26 and 27 and at 31 and 32 of Figure 3, and represents attenuation plotted against frequency. The two dotted curves 125 and 126 represent the characteristics of the filter circuits 27 and 26 respectively, while the full line curves 127 and 128 represent the characteristics of the filter circuits 32 and 31 respectively.

Assuming now that a marking frequency is being received and that the resultant frequency after heterodyning is given by M$_1$ on Figure 10, the input will then be above a level shown at 129, at which the current in the tube 111 causes the relay S$_1$T$_1$M$_1$ (Figure 9) to close on the contact S$_1$. The closing of the relay will then throw the resistance 116 into circuit and thus cause the heterodyne frequency to vary in such a way as to bring the resultant frequency towards the point M below which the relay space contact opens, and applies a correction in the opposite direction to the heterodyne oscillator. Thus the frequency in the circuit 26 of Figure 3 varies about the frequency M in Figure 10.

The distance $d$ between corresponding points on the curves 127 and 128 at the level 129 in Figure 10 is made approximately equal to the frequency separation between marking and spacing frequencies so that the parts of the curves utilised show a change of response in the same direction for a given change of frequency. However, the difference will not usually be exactly correct, and it will therefore be convenient first to consider a case when the transmitted frequencies are further apart than the distance $d$. Then if the resultant marking frequency is shown at M, the resultant spacing frequency will be lower than S. Thus the marking voltage applied to the transformer 100 is larger than the spacing voltage applied to the transformer 101, and so the frequency control will be exercised on the resultant marking frequency. If, however, only the spacing frequency is received for any length of time, either on account of the other frequency having faded, or on account of the transmitter having been left at space, then the frequency of the heterodyne oscillator will be controlled so that the spacing frequency comes approximately to point S.

Similarly if the separation between the two frequencies is less than the distance $d$, the resultant spacing frequency will vary about S, and if marking and spacing frequencies are present, then the control of the heterodyne oscillator will be exercised by the spacing frequency, and the marking frequency will not exercise any control except in the absence of any spacing frequency.

In the arrangement as described, it is convenient to arrange that the separation between the frequencies is slightly less than the separation $d$, so that normally, the resultant spacing frequency controls the heterodyne oscillator because the transmitter is more likely to be left in the spacing condition than in the marking condition, and then this does not entail a change from control by marking frequency to a control by spacing frequency.

The circuit must be arranged, of course, to exercise the control of the heterodyne oscillator in the required sense, and if the heterodyne frequency is changed from a lower to a higher frequency than the received frequencies, than the spacing contact and tongue of the relay 113, 114 of Figure 9 may be used, instead of the marking contact and the tongue.

Figure 11:
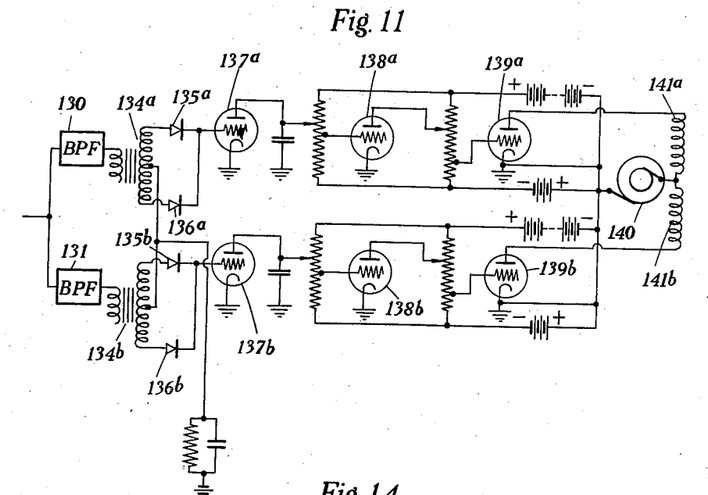
Figure 11 is a circuit diagram illustrating another arrangement for controlling the frequency of the heterodyne oscillator.

Another arrangement for controlling the frequency of the heterodyne oscillator is shown in Figure 11; it is suitable for use in telegraph transmitters as described above employing double-frequency keying but is also applicable to the more normal type of telegraph transmission in which there are quiescent periods during signalling.

Figure 14:
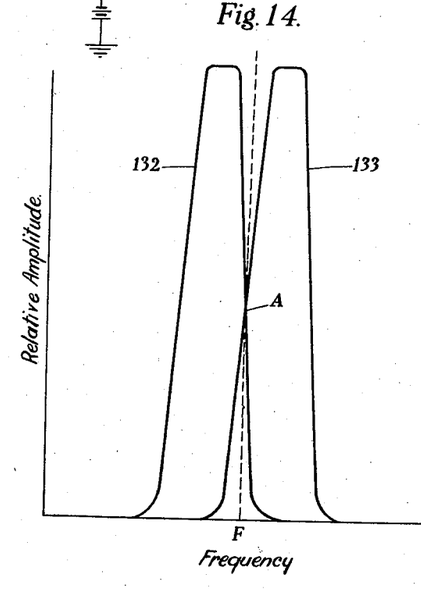
Figure 14 is a diagram of the response curves of the filter utilised in Figure 11.

The heterodyne oscillators 22, 24 in Figure 2 are adjusted in the first instance so as to produce the desired beat frequency F from the second oscillator 24. Energy at this beat frequency is supplied to two discriminating filters 130, 131 passing a relatively narrow band of frequencies as seen in Figure 14 in which the curve 132 represents the characteristic response of the filter 130 and the curve 133, the response of the filter 131.

The outputs of the filters 130, 131 are connected to two alternating current-to continuous current converter units shown in Figure 11, and each connected somewhat similarly to the rectifying and limiting unit shown in Figure 4. As in that figure, the two ends of the secondary winding of each of the transformers 134ª, 134ᵇ, are connected through dry contact rectifiers 135ª, 136ª, and 135ᵇ, 136ᵇ, to the grids of two discharge tubes 137ª, 137ᵇ which correspond to the tube 40 in Figure 4. The discharge tubes 138ª, 139ª and 138ᵇ and 139ᵇ correspond to the tubes 43 and 45 in Figure 4.

The anode source of potential for the output tubes 139ª, 139ᵇ is shown as an alternating source 140 although an interrupted continuous source may be used instead. In the anode circuits of the tubes 139ª, 139ᵇ, coils 141ª, 141ᵇ are connected and these are constituted by the windings of the electromagnets 142ª, 142ᵇ shown in Figure 12.

Figure 12:
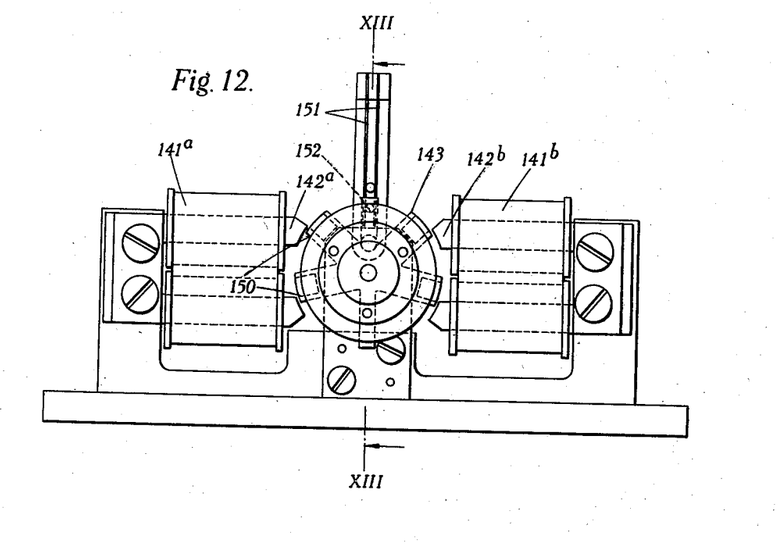
Figure 12 is an end elevation.
Figure 13:
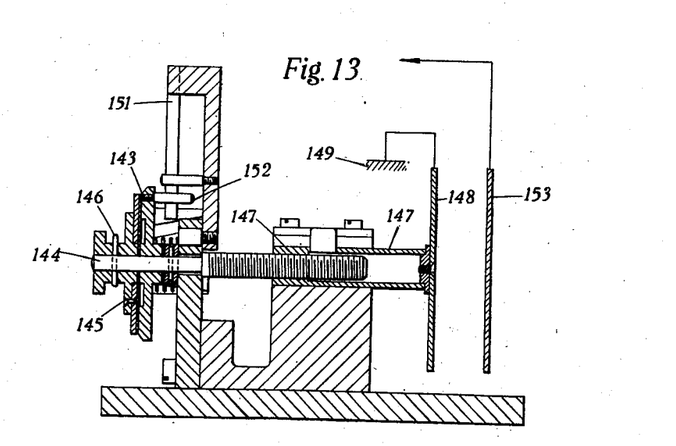

The said electromagnets form the primary member of an electro-motor built on the principle disclosed in British patent specification No. 221,844, Harry Vernon Higgett and another. The windings 141ª, 141ᵇ are wound differentially with respect to the rotor 143. The rotor 143 is loose on the spindle 144 but is associated with an iron clutch disc 145 which is pinned to the spindle 144 at 146. The spindle 144 is screwed into a sleeve 147 which is prevented from rotating and which carries at its extreme end a condenser vane 148 which is grounded at 149.

The rotor inductors 150 on the left in Figure 12 are seen to be just above the respective poles of the electromagnet 142ª so that if the winding 141ª receives a direct current pulse, the resultant field passes through the inductors 150 and the portion of the clutch disc 145 between them. The rotor is pulled against the disc 145 and is turned slightly counterclockwise simultaneously, causing the disc 145 and the spindle 144 to turn with the rotor. When the current pulse ceases, the field collapses and a pair of stationary blade springs 151 engaging a pin 152 on the rotor 143 immediately returns and centralizes the latter but the clutch disc does not return since the magnetic field has collapsed and therefore the disc is no longer attracted by the rotor. The rotor and disc are cadmium plated to prevent corrosion and a paper disc is interposed to prevent sticking of the clutch surfaces. Repeated current impulses in the winding 141ª result in the spindle 144 being turned counter-clockwise step-by-step and, in a similar fashion, repeated current impulses in the winding 141ᵇ result in the spindle 144 being turned clockwise step-by-step.

In the first instance when the beat frequency is set to the pre-determined value F, the output tubes 139ª, 139ᵇ are adjusted so that they just do not conduct. The condition is represented by the point A in Figure 14. Any slight change in the frequency F is accompanied by increase of current through one of the units according to one of the curves 132, 133, causing the corresponding output tube 139ª or 139ᵇ to conduct so that current flows in the winding 141ª or 141ᵇ. This current is intermittent owing to the alternating supply 140 so that the spindle 144 is turned step-by-step in one direction or the other thus causing the vane 148 to approach or recede from a fixed vane 153 depending upon which of the output tubes 139ª, 139ᵇ is rendered conductive. The resultant change of capacity in the condenser 148, 153 is arranged to react on the constants of the heterodyne oscillator so as to effect the necessary change in its frequency to maintain the beat frequency constant.

The range of correction can be varied within wide limits in accordance with the size of the variable condenser 148, 153 and the sensitivity of the converter units 137ª–141ª.

Satisfactory operation of the correcting device may also be obtained by initially setting the output tubes 139ª, 139ᵇ so that they conduct and balancing up the resulting fluxes set up by the windings 141ª, 141ᵇ.

We claim:

1. A radio telegraph receiver for receiving signals sent as alternate marking and spacing conditions at different signal frequencies comprising a circuit element tuned to receive both signal frequencies, a pair of electrical filters connected to receive the output of said circuit element and organised to pass respectively the components of said output representing the marking and spacing conditions of the signals, a pair of rectifier elements connected respectively to said filters for rectifying the outputs thereof and a dead-beat circuit comprising a pair of interconnected electron-discharge tubes with their control electrodes connected to receive the outputs of said rectifier elements in opposite senses so that the condition of stability of said dead-beat circuit is determined only by changes in the amplitudes of either or both of the outputs of said rectifier elements applied to said discharge tubes.

2. A radio telegraph receiver for receiving signals sent as alternate marking and spacing conditions at different signal frequencies comprising a circuit element tuned to receive both signal frequencies, a pair of electrical filters connected to receive the output of said circuit element and organised to pass respectively the components of said output representing the marking and spacing conditions of the signals, a pair of rectifier elements connected respectively to said filters for rectifying the outputs thereof, circuit means connected to said rectifier elements and organised to limit and remove abnormal amplitudes from the outputs of said rectifier elements, and a dead-beat circuit comprising a pair of interconnected electron discharge tubes with their control electrodes connected to receive the outputs of said rectifier elements in opposite senses so that the condition of stability of said dead-beat circuit is determined only by changes in the amplitudes of either or both of the outputs of said rectifier elements applied to said discharge tubes.

3. A radio telegragh receiver for receiving signals sent as alternate marking and spacing conditions at different signal frequencies comprising a circuit element tuned to receive both signal frequencies, a pair of electrical filters connected to receive the output of said circuit element and organised to pass respectively the components of said output representing the marking and spacing conditions of the signals, a pair of rectifier and limiter circuit elements connected respectively to said filters for rectifying and removing abnormal amplitudes from the outputs thereof, a dead-beat circuit comprising a pair of interconnected electron-discharge tubes with their control electrodes connected to receive the outputs of said rectifier and limiter elements in opposite senses and a pair of condensers each inserted between one of said rectifier and limiter elements and the corresponding electron discharge tube so as to render said dead-beat circuit sensitive only to changes in the amplitudes of either or both of the outputs of said rectifier and limiter elements.

4. A radio telegraph receiver for receiving signals sent as alternate marking and spacing conditions at different signal frequencies comprising a circuit element tuned to receive both signal frequencies, a pair of electrical filters connected to receive the output of said circuit element and organised to pass respectively the components of said output representing the marking and spacing conditions of the signals, a pair of rectifier and limiter circuit elements connected respectively to said filters for rectifying and removing abnormal amplitudes from the outputs thereof, a pair of electron discharge tubes with their control electrodes connected to receive the outputs of said rectifier and limiter elements in opposite senses, a pair of condensers each inserted between one of said rectifier and limiter elements and the corresponding electron discharge tube, a pair of resistance elements connected to couple the control electrode of each of said electron discharge tube to the anode of the other of said tubes, a source of potential connected to the anodes of said electron-discharge tubes, a further pair of resistance elements each connected between the cathode of one of said discharge tubes and the negative side of said source of potential and an electro-magnetic output relay having one winding connected in the anode circuit of one of said electron-discharge tubes and another winding connected in the anode circuit of the other of said electron-discharge tubes so that the output signal is controlled in accordance with the condition of stability of the dead-beat circuit constituted by said electron-discharge tubes and the associated interconnecting components.

5. A radio telegraph receiver for receiving signals sent as alternate marking and spacing conditions at different radio frequencies comprising a circuit element tuned to receive both of the radio frequencies, a heterodyne oscillator circuit connected to said circuit element to set up beat frequencies representing the marking and spacing signals and differing in frequency from one another by the difference between the transmitted marking and spacing frequencies, a pair of electrical filters connected to receive the said beat frequencies and organised to pass respectively the frequencies representing the marking and spacing conditions, a pair of rectifier elements connected respectively to said filters for rectifying the outputs thereof and a dead-beat circuit comprising a pair of interconnected electron-discharge tubes with their control electrodes connected to receive the outputs of said rectifier elements in opposite senses so that the condition of stability of said dead-beat circuit is determined only by changes in the amplitudes of either or both of the outputs of said rectifier elements applied to said discharge tubes.

6. A radio telegraph receiver for receiving signals sent as alternate marking and spacing conditions at different radio frequencies comprising a circuit element tuned to receive both of the radio frequencies, a heterodyne oscillator circuit connected to said circuit element to set up beat frequencies representing the marking and spacing signals and differing in frequency from one another by the difference between the transmitted marking and spacing frequencies, a pair of electrical filters connected to receive the said beat frequencies and organised to pass respectively the frequencies representing the marking and spacing conditions, a pair of rectifier elements connected respectively to said filters for rectifying the outputs thereof, circuit means connected to said rectifier elements and organised to limit and remove abnormal amplitudes from the outputs of said rectifier elements, and a dead-beat circuit comprising a pair of interconnected electron discharge tubes with their control electrodes connected to receive the outputs of said rectifier elements in opposite senses so that the condition of stability of said dead-beat circuit is determined only by changes in the amplitudes of either or both of the outputs of said rectifier elements applied to said discharge tubes.

7. A radio telegraph receiver for receiving signals sent as alternate marking and spacing conditions at different radio frequencies comprising a circuit element tuned to receive both of the radio frequencies, a heterodyne oscillator circuit connected to said circuit element to set up beat frequencies representing the marking and spacing signals and differing in frequency from one another by the difference between the transmitted marking and spacing frequencies, a pair of electrical filters connected to receive the said beat frequencies and organised to pass respectively the frequencies representing the marking and spacing conditions, a circuit connected to said electrical filters and responsive to the frequencies applied to said electrical filters and means controlled by said last-named circuit for controlling the frequency of said heterodyne oscillator circuit in such a way as to reduce variations in the frequencies applied to said electrical filters.

8. A radio telegraph receiver for receiving signals sent as alternate marking and spacing conditions at different radio frequencies comprising a circuit element tuned to receive both of the radio frequencies, a heterodyne oscillator circuit connected to said circuit element to set up beat frequencies representing the marking and spacing signals and differing in frequency from one another by the difference between the transmitted marking and spacing frequencies, a pair of electrical filters connected to receive the said beat frequencies and organised to pass respectively the frequencies representing the marking and spacing conditions, two further electrical filters connected respectively to said first-named electrical filters and having response curves each showing a change in response of the same sign for a given change of frequency and having a frequency separation substantially equal to the difference between the transmitted frequencies representing the marking and spacing conditions, a circuit responsive to the response of larger amplitude from the said two further electrical filters and means controlled by said last-named circuit for controlling the frequency of said heterodyne oscillator circuit so that the said response of larger amplitude is varied about a pre-determined amplitude.

9. A radio telegraph receiver for receiving signals sent as alternate marking and spacing conditions at different radio frequencies comprising a circuit element tuned to receive both of the radio frequencies, a heterodyne oscillator circuit connected to said circuit element to set up beat frequencies representing the marking and spacing signals and differing in frequency from one another by the difference between the transmitted marking and spacing frequencies, a pair of electrical filters connected to receive the said beat frequencies and organised to pass respectively the frequencies representing the marking and spacing conditions, two further electrical filters connected respectively to said first-named electrical filters and having response curves each showing a change in response of the same sign for a given change of frequency and having a frequency separation substantially equal to the difference between the transmitted frequencies representing the marking and spacing conditions, a circuit responsive to the response of larger amplitude from the said two further electrical filters, an electron discharge tube connected between the cathode and control electrode of said heterodyne oscillator tube and switching means controlled by the said response of larger amplitude for controlling the heating current of said electron discharge tube.

10. A receiver for radio signals comprising a tuned radio-frequency receiving circuit, a heterodyne oscillator circuit connected to said receiving circuit to set up a beat frequency, a pair of electrical band-pass filters connected to receive the output of said beat frequency and having response curves such that on a deviation of said beat frequency from a pre-determined value, the output of one of said filters is increased and the output of the other of said filters is decreased, a pair of rectifying and electron discharge amplifying devices connected respectively to receive the output of said band-pass filters, a source of intermittent electrical supply for the output circuits of said amplifying devices, a pair of electro-magnets having their windings differentially connected and each included in the output circuit of one of said amplifying devices, and means selectively controlled by said electromagnets for controlling the frequency of said heterodyne oscillator circuit in such a way as to reduce variations in said beat frequency.

11. In a transmission system having means for alternately transmitting marking signals at one frequency and spacing signals at another frequency, a receiver comprising a path for selectively receiving signals of marking frequency and a second path for selectively receiving signals of spacing frequency, an electro-magnetic output relay having a marking position and a spacing position, control relay means interposed between said marking path and said output relay and being responsive to marking signals for operating said output relay to marking position at the beginning of each marking signal and to the spacing position at the end of each marking signal, a second control relay means interposed between said spacing path and said output relay and being responsive to spacing signals for operating said output relay to spacing position at the beginning of each spacing signal and to marking position at the end of each spacing signal and to marking position at the end of each spacing signal, said two control relay means being interconnected to maintain said output relay in the last operated position, and either of said control relay means being effective to operate said output relay to the opposite position on receipt of the next signal corresponding to such position.

12. In a transmission system having means for alternately transmitting marking signals at one frequency and spacing signals at another frequency, a receiver comprising a path for selectively receiving signals of marking frequency and a second path for selectively receiving signals of spacing frequency, means included in said marking path for producing a control impulse at the beginning of each marking signal unit and a control impulse at the end of each marking signal unit, means included in said spacing path for producing a control impulse at the beginning of each signal unit and a control impulse at the end of each signal unit, an electro-magnetic output relay having a marking position and a spacing position and including means for maintaining said relay in either operated position in the absence of a change in energizing conditions, and control relay means interposed between said output relay and said impulse producing means and being responsive to either the beginning impulse on said marking path or the ending impulse in said spacing path for operating said output relay to marking position and responsive to either the ending impulse in said marking path or a beginning impulse in said spacing path for operating said output relay to spacing position.

13. In a transmission system having means for alternately transmitting marking signals at one frequency and spacing signals at another frequency, a receiver comprising a path for selectively receiving signals of marking frequency and a second path for selectively receiving signals of spacing frequency, means in each of said paths for translating said marking and spacing frequencies into marking and spacing current impulses, means in each of said paths for producing control impulses at the beginning and at the end, respectively, of each signal impulse, an electromagnetic output relay having a marking position and a spacing position and including means for maintaining said relay in either operated position in the absence of a change in energizing conditions, and control relay means interposed between said output relay and said control impulse producing means and being responsive to either the beginning control impulses in said marking path or the ending control impulses in said spacing path for operating said output relay to marking position and responsive to either the beginning control impulses in said spacing path or the ending control impulses in said marking path for operating said output relay to spacing position.

14. In a transmission system having means for alternately transmitting marking signals at one frequency and spacing signals at another frequency, a receiver comprising a path for selectively receiving signals of marking frequency and a second path for selectively receiving signals of spacing frequency, rectifier means in each of said paths for translating said marking and spacing frequencies into direct current impulses, means in each of said paths for producing a negative control impulse at the beginning of each direct current impulse and for producing a positive control impulse at the end of each direct current impulse, an electro-magnetic output relay provided with a pair of operating windings and having a marking position and a spacing position, control relay means for energizing said windings, including a pair of three element thermionic relay tubes, connections between said relay tubes for maintaining the grid element of one tube negative when the other tube is operating, and connections for applying the control impulses of said marking path to the grid element of one tube and the control impulses of the spacing path to the grid element of the other tube, said control relay means having two positions of stability and being operable from one position of stability to the other by the application of a control impulse of positive polarity to the grid of the unoperated tube or of negative polarity to the grid of the operated tube.

ALBERT MAURICE HUMBY.
JOHN ARTHUR SMALE.
EDWARD GEORGE COPPER.